United States Patent
Yokota

(10) Patent No.: US 8,260,299 B2
(45) Date of Patent: Sep. 4, 2012

(54) RADIO COMMUNICATION DEVICE AND RADIO COMMUNICATION METHOD

(75) Inventor: Tomoyoshi Yokota, Yokohama (JP)

(73) Assignee: Kyocera Corporation, Kyoto (JP)

( * ) Notice: Subject to any disclaimer, the term of this patent is extended or adjusted under 35 U.S.C. 154(b) by 318 days.

(21) Appl. No.: 12/531,479

(22) PCT Filed: Mar. 14, 2008

(86) PCT No.: PCT/JP2008/054809
§ 371 (c)(1),
(2), (4) Date: Nov. 3, 2009

(87) PCT Pub. No.: WO2008/114751
PCT Pub. Date: Sep. 25, 2008

(65) Prior Publication Data
US 2010/0062773 A1    Mar. 11, 2010

(30) Foreign Application Priority Data
Mar. 16, 2007  (JP) .................................. 2007-069564

(51) Int. Cl.
*H04W 36/00* (2009.01)

(52) U.S. Cl. ........ 455/436; 455/437; 455/438; 455/442; 455/443; 455/444; 455/550.1; 455/552.1; 455/553.1; 370/310.2; 370/328; 370/331; 370/338

(58) Field of Classification Search .......... 455/436–444, 455/550.1, 552.1, 553.1; 370/310.2, 328, 370/331–334, 338
See application file for complete search history.

(56) References Cited

U.S. PATENT DOCUMENTS

| | | | |
|---|---|---|---|
| 5,448,569 A | 9/1995 | Huang et al. | 370/95.1 |
| 5,862,476 A | 1/1999 | Hasegawa | |
| 6,006,105 A * | 12/1999 | Rostoker et al. | 455/552.1 |
| 6,763,234 B1 | 7/2004 | Kabasawa | 455/436 |
| 6,898,430 B1 * | 5/2005 | Liberti et al. | 455/445 |
| 7,130,657 B1 * | 10/2006 | Sampath et al. | 455/561 |
| 7,194,266 B2 | 3/2007 | Ishikawa et al. | 455/442 |
| 7,339,909 B2 * | 3/2008 | Kotzin | 370/331 |
| 7,596,378 B1 * | 9/2009 | Nizri et al. | 455/448 |
| 7,606,200 B2 * | 10/2009 | Kwak et al. | 370/331 |
| 2002/0119779 A1 | 8/2002 | Ishikawa et al. | 455/437 |

(Continued)

FOREIGN PATENT DOCUMENTS
JP    07-297841    11/1995
(Continued)

OTHER PUBLICATIONS

Japanese language office action dated Nov. 1, 2011 and its English language translation for corresponding Japanese application 2007069564.

(Continued)

*Primary Examiner* — Steve D Agosta
(74) *Attorney, Agent, or Firm* — DLA Piper LLP (US)

(57) ABSTRACT

When communication quality exceeds the first threshold, the radio communication terminal 300 starts connection with the radio communication system 120 and establishes the radio link L2 to the radio communication system 120. Further, a handover from the radio link L1 to the radio link L2 is performed when the communication quality exceeds the second threshold after the establishment of the radio link L2, the second threshold corresponding to communication quality degraded than that indicated by the first threshold.

1 Claim, 4 Drawing Sheets

U.S. PATENT DOCUMENTS

| | | |
|---|---|---|
| 2005/0266845 A1* | 12/2005 | Aerrabotu et al. ............ 455/436 |
| 2008/0051130 A1* | 2/2008 | Juneja et al. ............... 455/552.1 |
| 2009/0201876 A1 | 8/2009 | Morimoto et al. ............ 370/330 |

FOREIGN PATENT DOCUMENTS

| | | |
|---|---|---|
| JP | 08242486 A | 9/1996 |
| JP | 09-224275 | 8/1997 |
| JP | 2001-045533 | 2/2001 |
| JP | 2002-232929 | 8/2002 |
| JP | 2004320473 A | 11/2004 |
| JP | 2006-311475 | 11/2006 |
| WO | 2006088318 A1 | 8/2006 |

OTHER PUBLICATIONS

Japanese language office action dated Feb. 7, 2012 and its English language translation issued in corresponding Japanese application 2007069564.

* cited by examiner

RADIO COMMUNICATION DEVICE AND RADIO COMMUNICATION METHOD

CROSS-REFERENCE TO THE RELATED APPLICATIONS

This application is a national stage of international application No. PCT/JP2008/054809 filed on Mar. 14, 2008, which also claims the benefit of priority under 35 USC 119 to Japanese Patent Application No. 2007-069564 filed on Mar. 16, 2007, the entire contents of which are incorporated herein by reference.

TECHNICAL FIELD

The present invention relates to a radio communication device that performs radio communication by connecting to a first radio communication system and to a second radio communication is system different from the first communication system, and also relates to a radio communication method.

BACKGROUND ART

Recently, with the advancement in radio communication technologies, an environment is being developed in which a mobile radio communication device, such as a mobile phone terminal, can simultaneously use multiple radio communication systems having different physical-layer schemes. For example, the radio communication systems include a mobile phone system, a wireless broadband system such as iBurst, and a wireless MAN system such as Wi-MAX.

To improve convenience for the radio communication device using such multiple radio communication systems, IP mobility protocols are defined, such as Mobile IPv6 (see Non-patent Document 1) and NEMO Basic Support (see Non-patent Document 2) (for instance, Non-patent Documents 1 and 2).

Non-patent Document 1: Johnson, D., Perkins, C. and Arkko, J, "Mobility Support in IPv6 RFC3775," IETF, 2004

Non-patent Document 2: Devarapali, V, et al., "Network Mobility (NEMO) Basic Support Protocol, RFC3963," IETF, 2005

DISCLOSURE OF TILE INVENTION

In a handover to a different radio communication system in conformity with the above-described conventional IP mobility protocol (specifically, in a link-layer handover), the followings are performed sequentially: (1) disconnecting connection to a radio communication system (handover source) of a radio communication system to which a radio communication device is being connected; (2) connecting to a handover-target radio communication system; and (3) performing handover to the handover-target radio communication system.

For that reason, to avoid packet loss and the like occurring in a handover to a different radio communication system, the radio communication device needs to be constantly connected to multiple radio communication systems. This causes a problem of an increase in power consumption by the radio communication device, thereby shortening the duration of a battery.

The present invention has been made in consideration of such circumstances, and has an objective of providing a radio communication device and a radio communication method, with which a handover can be performed with reduced power consumption and with less chance of packet loss, when multiple radio communication systems employing different physical-layer schemes are used.

The present invention has the following characteristics to solve the problems described above. First of all, a first characteristic of the present invention is summarized in that a radio communication device (radio communication terminal 300) includes: a radio communication unit (radio communication unit a 301, 303) configured to perform radio communication by connecting to a first radio communication system (radio communication system 110) and to a second radio communication system (radio communication system 120) different from the first radio communication system; and a mobility manager (mobility manager 304) configured to manage mobility from the first radio communication system to the second radio communication system, and the radio communication device includes: a communication quality acquirer (communication quality acquirer 305) configured to acquire communication quality of a first radio link (radio link L1) established with the first radio communication system; a communication quality determination unit (communication quality determination unit 307) configured to determine whether or not the communication quality acquired by the communication quality acquirer exceeds a first threshold (threshold TH1) or a second threshold (threshold TH2) corresponding to the communication quality degraded than that indicated by the first threshold; and a handover controller (handover controller 309) configured to control a handover from the first radio communication system to the second radio communication system, wherein when the communication quality determination unit determines that the communication quality exceeds the first threshold, the handover controller starts connection with the second radio communication system and establishes a second radio link (radio link L2) with the second radio communication system, and when the communication quality determination unit determines that the communication quality exceeds the second threshold after the second radio link has been established, the handover controller performs a handover from the first radio link to the second radio link.

According to such a radio communication device, when the communication quality of the first radio link established with the first radio communication system exceeds the first threshold, the radio communication device starts connection with the second radio communication system, namely, establishment of the second radio link to the second radio communication system. Further, a handover from the first radio link to the second radio link is performed when the communication quality of the first radio link exceeds the second threshold after the establishment of the second radio link, the second threshold corresponding to communication quality degraded than that indicated by the first threshold.

Accordingly, when the first radio link offers good communication quality, the radio communication device does not connect to the second radio communication system. This makes it possible to reduce power consumption by the radio communication device, namely, to extend the duration of the battery.

Moreover, since the second radio link is already established when a handover is performed in response to the fact that the communication quality of the first radio link exceeds the second threshold, drastic communication-quality deterioration, such as packet loss in a handover, can be avoided. Further, since the second radio link is already established when a handover is performed, a prompt handover can be accomplished.

A second characteristic of the present invention is according to the first characteristic of the present invention, and is summarized in that the handover controller causes the radio communication unit to transmit the same packets (IP packet P) simultaneously via the first radio link and the second radio link, and when the radio communication unit has received a packet via the second radio link, the handover controller disconnects the first radio link.

A third characteristic of the present invention is according to any one of the first and the second characteristic of the present invention, and is summarized in that the handover controller includes a media independent handover function (MIH function 311) not depending on a configuration of a physical layer of each of the first radio communication system and the second radio communication system, and the media independent handover function performs the handover based on an instruction from a protocol (MIH user 313) positioned in a layer higher than the media independent handover function.

A fourth characteristic of the present invention is summarized as a radio communication method of performing radio communication by connecting to a first radio communication system and to a second radio communication system different from the first radio communication system. The radio communication method includes the steps of: acquiring communication quality of a first radio link established with the first radio communication system; determining whether or not the communication quality acquired exceeds a first threshold; and when it is determined that the communication quality exceeds the first threshold, starting connection with the second radio communication system and establishing a second radio link with the second radio communication system; determining whether or not the communication quality exceeds a second threshold corresponding to the communication quality degraded than that indicated by the first threshold; and when it is determined that the communication quality exceeds the second threshold after the second radio link has been established, performing a handover from the first radio link to the second radio link.

According to the characteristics of the present invention, a radio communication device and a radio communication method can be provided, with which a handover can be performed with reduced power consumption and with less chance of packet loss, when multiple radio communication systems employing different physical-layer schemes are used.

BEST MODES FOR CARRYING OUT THE INVENTION

Figure 1:
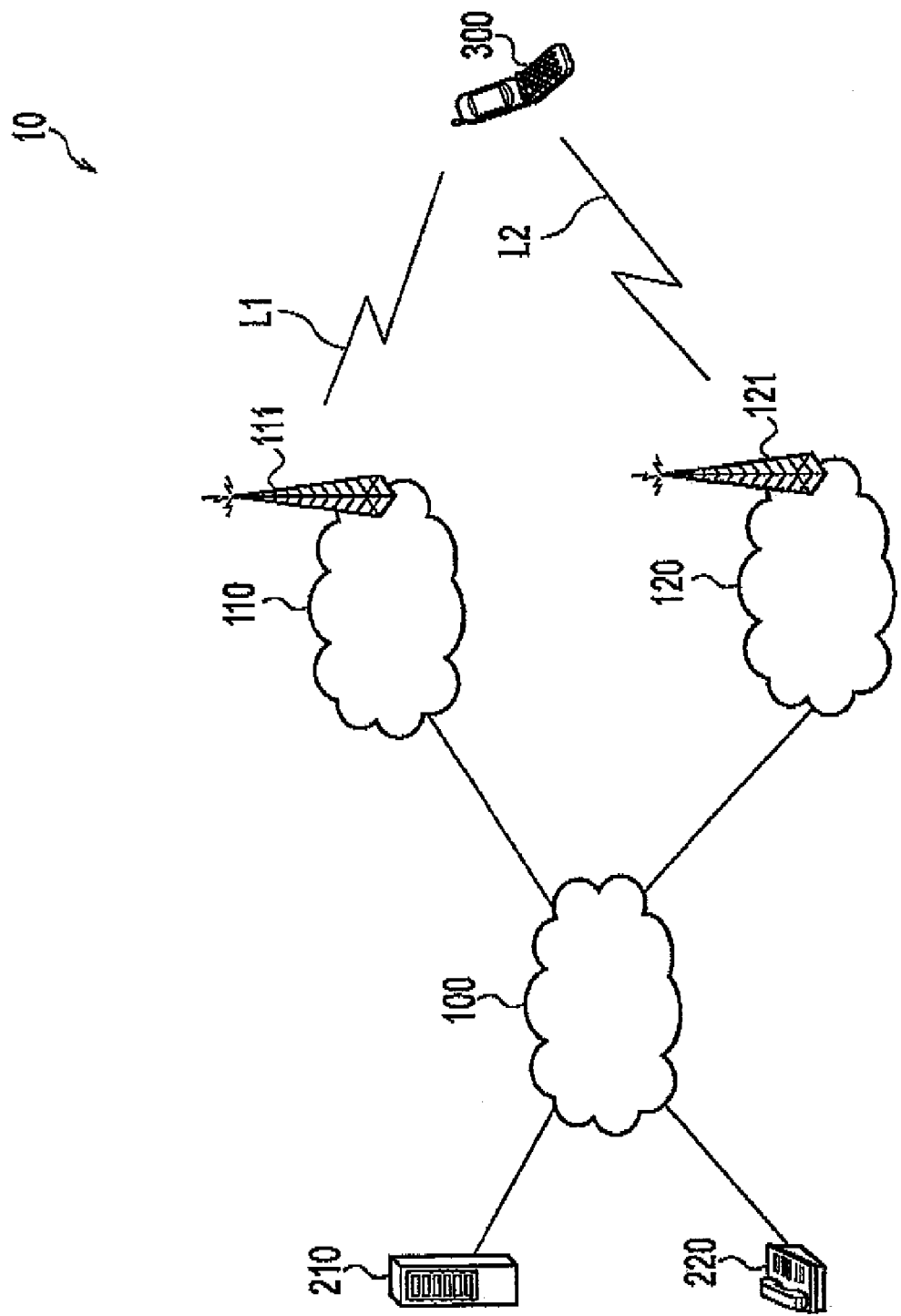
FIG. 1 is a diagram showing an overall schematic configuration of a communication network including a radio communication device according to an embodiment of the present invention.

Next, embodiments of the present invention will be described. Specifically, what will be described are: (1) an overall schematic configuration of a communication network, (2) a functional block configuration of a radio communication device, (3) an operation of the radio communication device, (4) functions and effects, and (5) other embodiments.

Note that, throughout the following descriptions of the drawings, the same or like parts bear the same or like reference numerals. It should be noted, however, that the drawings are schematic, and that the dimensional proportions and the like are different from their actual values.

Accordingly, specific dimensions and the like should be inferred based on the description given below. Moreover, dimensional relationships and dimensional proportions may differ from one drawing to another in some parts, of course.

(1) Overall Schematic Configuration of Communication Network

FIG. 1 is a diagram showing an overall schematic configuration of a communication network 10 including a radio communication terminal 300 that constitutes a radio communication device in the present embodiment. As FIG. 1 shows, the communication network 10 includes an Internet 100, a radio communication system 110, and a radio communication system 120.

In the embodiment, the radio communication system 110 is configured by a wireless MAN system. Specifically, the radio communication system 110 is a radio communication system in conformity with iBurst. The radio communication system 110 includes a radio base station 111 performing radio communication with the radio communication terminal 300.

In the embodiment, the radio communication system 120 is configured by a mobile phone system.

Specifically, the radio communication system 120 is a third generation mobile phone system employing a CDMA scheme. More specifically, the radio communication system 120 is a radio communication system in conformity with a scheme (such as cdma2000 1x-EVDO) capable of high-speed IP packet communications. The radio communication system 120 includes a radio base station 121 performing radio communication with the radio communication terminal 300.

A home agent 210 and an IP phone terminal 220 are connected to the Internet 100.

The home agent 210 is a home agent in conformity with Mobile as IPv6. The home agent 210 acquires a care-of address (CoA) from the radio communication terminal 300. The home agent 210 associates the care-of address acquired from the radio communication terminal 300, with a home address (HoA) being a fixed IP address identifying the mobile communication terminal 300.

The IP phone terminal 220 is a phone terminal using Voice over IP (VoIP). The IP phone terminal 220 transmits and receives VoIP packets via the Internet 100.

The radio communication terminal 300 is capable of radio communication by connecting to the radio communication system 110 and the radio communication system 120. Specifically, the radio communication terminal 300 establishes a radio link L1 with the radio base station 111 and performs radio communication via the radio link L1. Likewise, the radio communication terminal 300 establishes a radio link L2 with the radio base station 121 and performs radio communication via the radio link L2.

Figure 2:
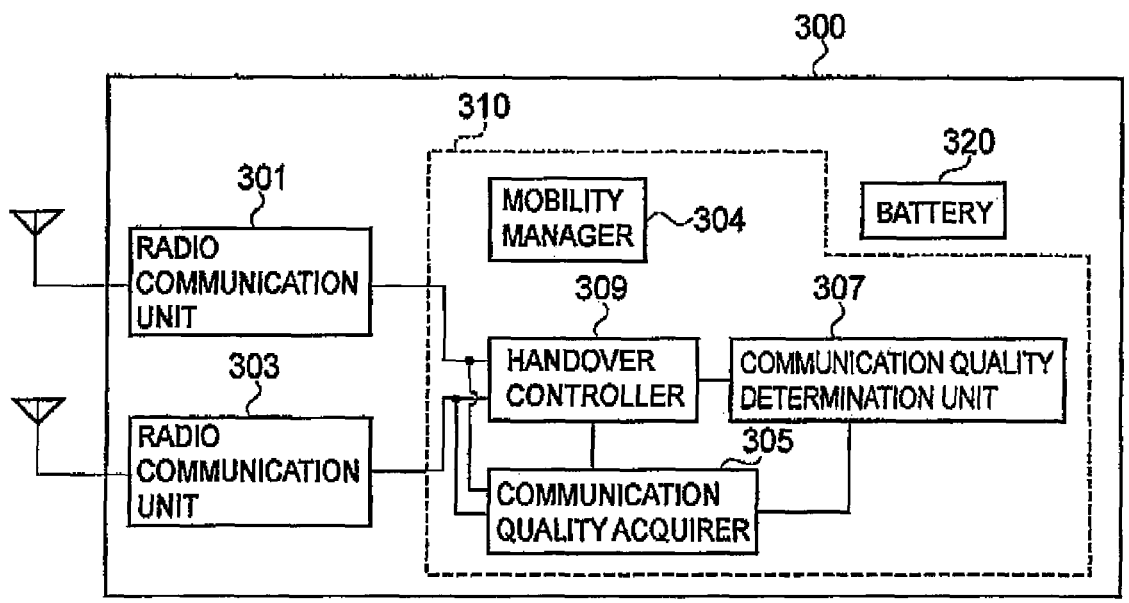
FIG. 2 is a diagram showing a functional block configuration of the radio communication device according to the embodiment of the present invention.

To perform radio communication by connecting to the radio communication system 110 and the radio communication system 120 which are different in at least physical-layer schemes they employ, the radio communication terminal 300 has two different radio communication units, specifically, radio communication units 301 and 303 (not shown in FIG. 1, see FIG. 2).

In the embodiment, the radio communication terminal 300 transmits and receives VoIP packets to and from the IP phone terminal 220 by using one of the radio communication system 110 and the radio communication system 120 or using both of the radio communication systems at the same time. In the embodiment, the radio communication terminal 300 uses the radio communication system 110 (iBurst) preferentially over the radio communication system 120 (cdma2000 1x-EVDO). The radio communication terminal 300 uses the radio communication system 120 when unable to obtain desired communication quality from the radio communication system 110 and therefore unable to use the radio communication system 110.

Moreover, to extend the duration of a battery 320, the radio communication terminal 300 does not connect to both the radio communication systems for a long time (so-called constant connection).

(2) Functional Block Configuration of Radio Communication Device

Next, a description will be given of a functional block configuration of the radio communication terminal 300 constituting the radio communication device in the embodiment. Specifically, of the radio communication terminal 300, an overall block configuration and a protocol stack of a handover controller will be described.

(2.1) Overall Block Configuration

FIG. 2 is a diagram showing a functional block configuration of the radio communication terminal 300. As FIG. 2 shows, the radio communication terminal 300 includes a radio communication unit 301, a radio communication unit 303, a mobility manager 304, a communication quality acquirer 305, a communication quality determination unit 307, a handover controller 309, and a battery 320. It should be noted that only the functional blocks relating to the present invention are described here, and that the radio communication terminal 300 includes other functional blocks (e.g., a baseband processor and a user interface unit) that are not shown.

The radio communication unit 301 performs radio communication in conformity with iBurst employed in the radio communication system 110.

The radio communication unit 303 performs radio communication in conformity with cdma2000 1x-EVDO employed in the radio communication system 120.

The mobility manager 304 manages mobility of the radio communication terminal 300 from the radio communication system 110 to the radio communication system 120, and from the radio communication system 120 to the radio communication system 110.

Specifically, the mobility manager 304 performs processing necessary for obtaining IP mobility of the radio communication terminal 300. In the embodiment, according to NEMO Basic Support, the mobility manager 304 performs the processing necessary for obtaining IP mobility of the radio communication terminal 300.

As mentioned above, in the embodiment, the radio communication terminal 300 uses the radio communication system 110 (iBurst) preferentially over the radio communication system 120 (cdma2000 1x-EVDO). In other words, when the radio link L1 offers good communication, quality, the radio link L2 is not established, so that the radio communication terminal 300 does so not connect to the radio communication system 120 (radio base station 121). Accordingly, to extend the duration of the battery 320, when the radio link L1 offers good communication quality, no power is supplied to the radio communication unit 303 performing radio communication in conformity with cdma2000 1x-EVDO employed in radio communication system 120.

The communication quality acquirer 305 acquires the communication quality of the radio link L1 established with the radio communication system 110. In addition, the communication quality acquirer 305 acquires the communication quality of the radio link L2 established with the radio communication system 120.

Specifically, the communication quality acquirer 305 acquires the following communication quality parameters regarding the radio link L1:
 (a) signal-to-interference-plus-noise ratio (SINR)
 (b) receive signal strength indication (RSSI)
 (c) transmission power
 (d) uplink and downlink throughputs Further, the communication quality acquirer 305 acquires the following communication quality parameters regarding the radio link L2:
 (a) SINR
 (b) RSSI
 (c) DRC (Data Rate Control)

Figure 5:
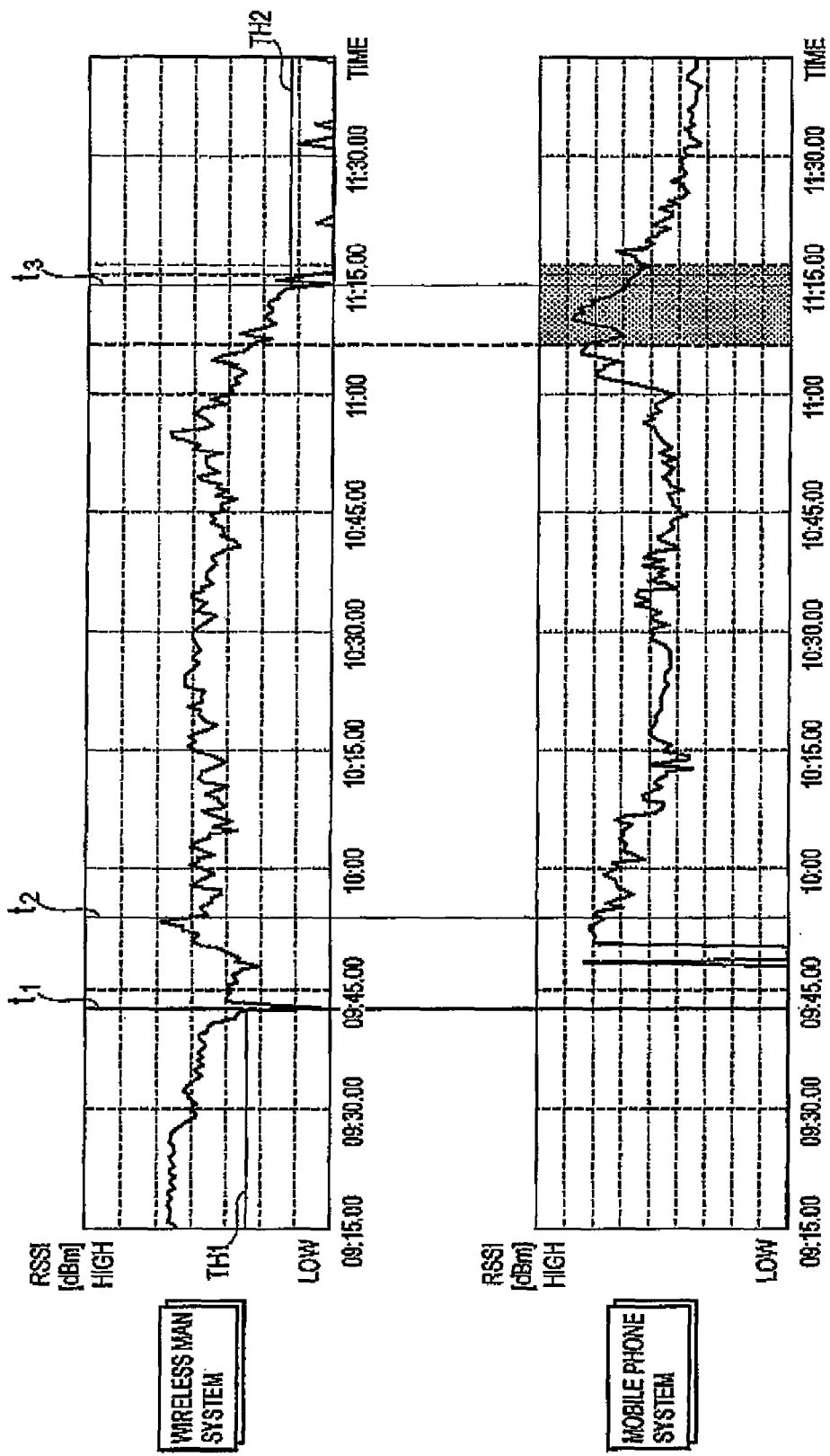
FIG. 5 is a diagram showing time transition of the communication quality of radio signals transmitted from a radio communication system according to the embodiment of the present invention.

The communication quality determination unit 307 determines whether the communication quality acquired by the so communication quality acquirer 305 exceeds a predetermined threshold or not. Specifically, as FIG. 5 shows, the communication quality determination unit 307 determines whether the communication quality (specifically, RSSI) acquired by the communication quality acquirer 305 exceeds a threshold TH1 (first threshold) or not. In addition, the communication quality determination unit 307 determines whether or not the communication quality exceeds a threshold TH2 (second threshold) corresponding to communication quality degraded than that indicated by the threshold TH1.

In the embodiment, regarding the radio link L1, the communication quality determination unit 307 can set the threshold TH1 and the threshold TH2 for the following communication quality parameters:
 (a) RSSI
 (b) SINR
 (c) rate of transmitting data
 (d) rate of receiving data Further, regarding the radio link L2, the communication quality determination unit 307 can set the threshold TH1 and the threshold TH2 for the following communication quality parameters:
 (a) RSSI
 (b) carrier-to-interference ratio (CIR)
 (c) transmission power The handover controller 309 controls a handover from the radio communication system 110 to the radio communication system 120.

Specifically, the handover controller 309 starts connection with the radio communication system 120 when the communication quality determination unit 307 determines that the communication quality of the radio link L1 exceeds the threshold TH1. Moreover, the handover controller 309 establishes the radio link L2 with the radio communication system 120.

Further, the handover controller 309 performs a handover from the radio link L1 to the radio link L2 when the communication quality determination unit 307 determines that the communication quality of the radio link L1 exceeds the threshold TH2 after the establishment of the radio link L2.

The handover controller 309 is capable of causing the radio communication unit 301 and the radio communication unit 303 to simultaneously transmit the same packets, or specifically, IP packets P, via the radio link L1 and the radio link L2, respectively. In addition, the handover controller 309 can disconnect the radio link L1 when the radio communication unit 303 receives the IP packet P via the radio link L2.

The battery 302 supplies power necessary for operations of each of the functional blocks constituting the radio communication terminal 300.

(2.2) Protocol Stack of the Handover Controller

Figure 3:
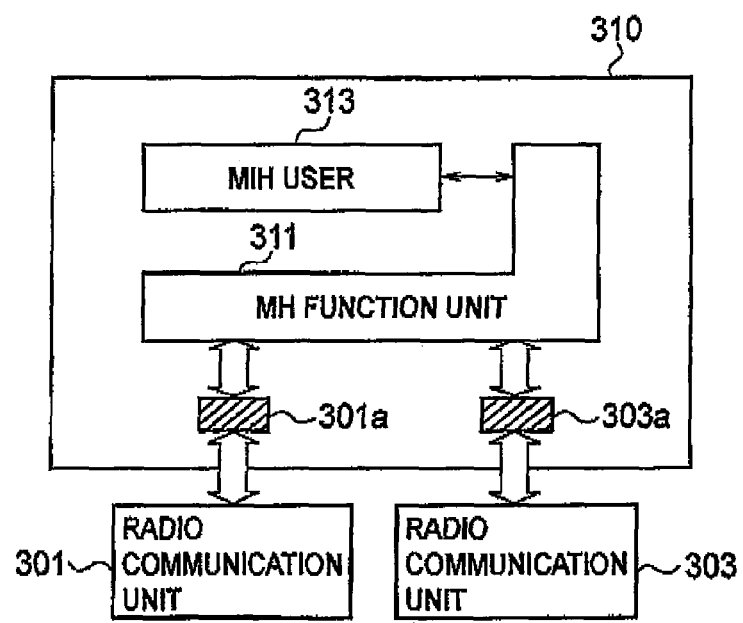
FIG. 3 is a diagram showing a protocol stack implemented by the radio communication device according to the embodiment of the present invention.

FIG. 3 shows a protocol stack 310 implemented by the mobility manager 304, the communication quality acquirer 305, the communication quality determination unit 307, and the handover controller 309. As FIG. 3 shows, the protocol stack 310 includes a link layer 301*a*, a link layer 303*a*, a MIH (Media Independent Handover) function 311, and a MIH user 313.

The link layer 301*a* provides a function for an interface (device driver) with the radio communication unit 301. Likewise, the link layer 303*a* provides a function for an interface (device driver) with the radio communication unit 303.

The MIH function 311 is a media independent handover function not depending on the configuration of a physical layer of each of the radio communication system 110 and the radio communication system 120. In the embodiment, the MIH function 311 is configured by a media independent handover function defined in IEEE802.21. In the embodiment, the MIH function 311 supports the function of the handover controller 309.

The MIH function 311 perform a handover from the radio link L1 to the radio link L2, according to an instruction by the MIH user 313 being a protocol positioned in a layer higher than the MIH function 311.

The MIH function 311 receives LINK events from the link layers 301*a* and 303*a*, and transmits LINK commands including a request for acquiring communication quality, a handover command, and the like.

The MIH user 313 is positioned in a layer higher than the MIH function 311. The MIH user 313 communicates with the MIH function 311. In the embodiment, the MIH user 313 is configured by NEMO Basic Support or the like. Further, the MIH user 313 includes Multiple Care-of Address Registration (MCoA) being an expanded specification of Mobile IPv6/NEMO Basic Support.

The MIR user 313 further supports the functions of the communication quality acquirer 305 and the communication quality determination unit 307.

Specifically, the MIR user 313 receives MIH events from the MIH function 311 and transmits MIH commands by including means for requesting acquisition of communication quality and means for instructing a handover.

(3) Operation of Radio Communication Device

Figure 4:
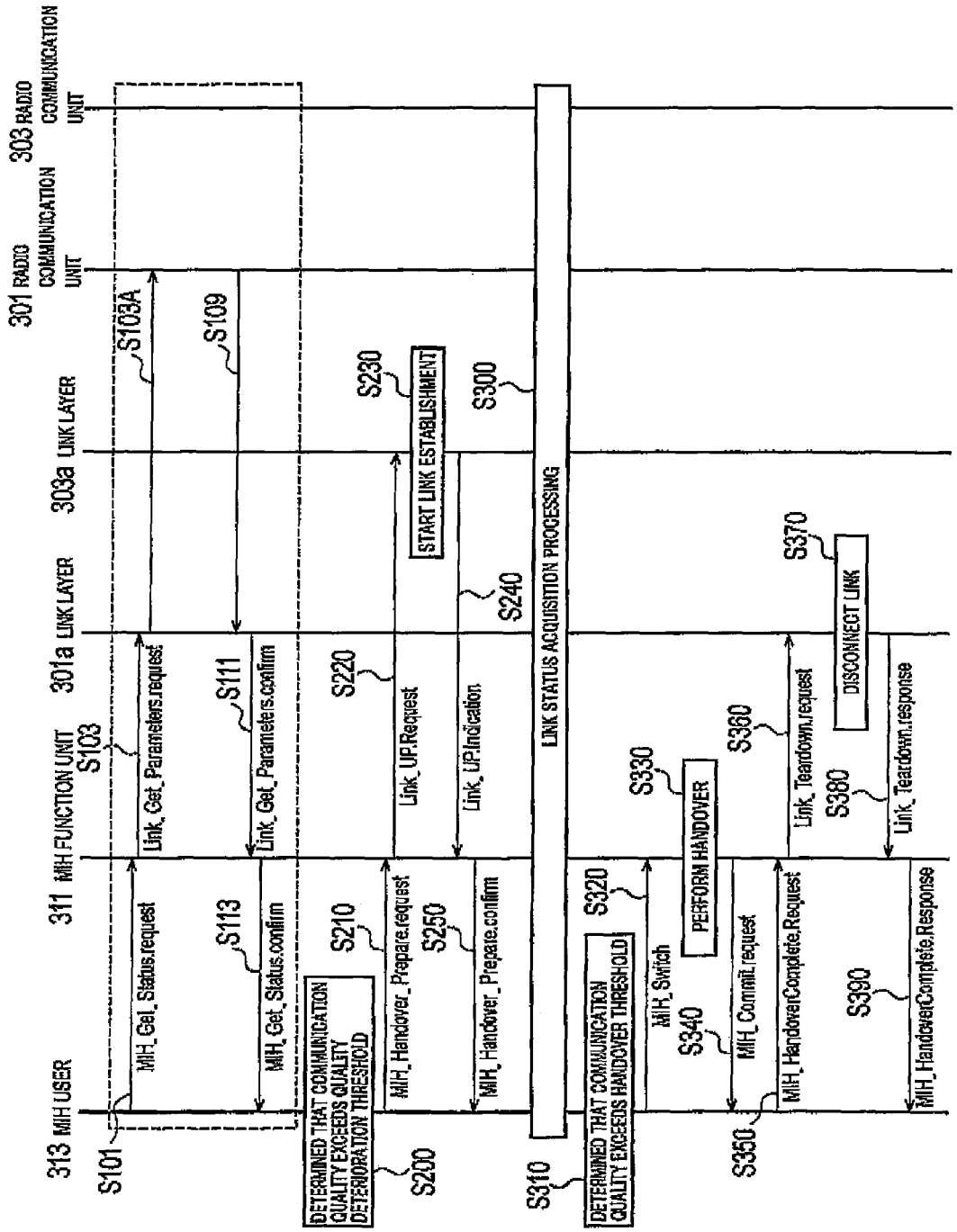
FIG. 4 is a diagram showing an internal sequence followed when the radio communication device according to the embodiment of the present invention performs a handover.

Referring to FIGS. 4 and 5, a description will next be given of an operation of the radio communication terminal 300 constituting the radio communication device in the embodiment. Specifically, a description will be given of an operation of the radio communication terminal 300 performing a handover from the radio communication system 110 to the radio communication system 120.

FIG. 4 is a diagram showing an internal sequence followed when the radio communication terminal 300 performs a handover from the radio communication system 110 to the radio communication system 120. Here, assume that the radio communication terminal 300 has established the radio link L1 with the radio communication system 110 (radio base station 111), and has been transmitting and receiving VoIP packets to and from the IP phone terminal 220.

FIG. 5 is a diagram showing time transition of the communication quality of radio signals transmitted from the radio communication system 110 (wireless MAN system) and the radio communication system 120 (mobile phone system).

As FIG. 4 shows, in Step S101, the MIH user 313 requests the MIH function 311 to acquire the communication quality of the radio link L1. Specifically, to the MIH function 311, the MIH user 313 transmits MIH_Get_Status.request being an MIH command requesting acquisition of communication quality.

In Step S103, the MIH function 311 requests the link layer 301*a* to acquire the communication quality of the radio link L1. Specifically, to the link layer 301*a*, the MIH function 311 transmits Link_Get_Parameters.request being a LINK command requesting acquisition of communication quality.

In Step S103A, based on the Link_Get_Parameters.request received from the MIH function 311, the link layer 301*a* transmits an acquisition request for communication quality, to the radio communication unit 301. Here, assume that RSSI is acquired as the communication quality of the radio link L1.

In Step S109, based on the acquisition request for communication quality received from the link layer 301*a*, the radio Communication unit 301 transmits the RSSI of radio signals constituting the radio link L1, to the link layer 301*a*.

In Step S111, to the MIH function 311, the link layer 301*a* transmits the RSSI received from the radio communication unit 301. Specifically, to the MIH function 311, the link layer 301*a* transmits Link_Get_Parameters.confirm being a LINK event including the RSSI received from the radio communication unit 301.

In Step S113, to the MIH user 313, the MIH function 311 transmits the RSSI received from the link layer 301*a*. Specifically, to the MIH user 313, the MIH function 311 transmits MIH_Get_Status.confirm being an MIH event including the RSSI received from the link layer 301*a*.

In the embodiment, the processing performed in Steps S101 to S113 described above is repeated at every 500 ms. Moreover, fluctuation of the RSSI owing to fading of the radio signals constituting the radio link L1 may lead to erroneous determination that the RSSI exceeds the threshold TH1. To avoid such erroneous determination, the link layer 301*a* equates the numeric values of the communication quality (e.g., RSSI) acquired from the radio communication unit 301 at every 500 ms and transmits the equated numeric value of the communication quality to the MIH function 311. Note that the link layer 303*a* too can operate like the link layer 301*a*.

In Step S200, the MIX user 313 determines that the communication quality of the radio link L1 exceeds the threshold TH1 (communication quality deterioration threshold). Specifically, based on the RSSI included in the MIH_Get_Status.confirm received from the MIH function 311, the MIH User 313 determines that the communication quality of the radio link L1 exceeds the threshold TH1. It should be noted that, in the embodiment, what is meant by "exceeding the threshold TH1" so is that the RSSI falls below a predetermined value (the same is true in the following).

Specifically, as FIG. 5 shows, it is determined at timing $t_1$ that the communication quality of the radio communication system 110 (wireless VIM system), namely, the RSSI of the radio link L1 exceeds (namely, falls below) the threshold TH1.

In Step S210, the MIH user 313 requests the MIH function 311 to prepare for a handover. Specifically, to the MIH function 311, the MIR user 313 transmits MIH_Handover_Prepare.request being an MIH command requesting handover preparation.

In Step S220, based on the MIH_Handover_Prepare.request received from the MIH user 313, the MIH function 311 requests the link layer 303a to establish the radio link L2. Specifically, to the link layer 303a, the MIH function 311 transmits Link_UP.request being a LINK command requesting establishment of a radio link.

In Step S230, based on the Link_UP.request received from the MIH function 311, the link layer 303a starts establishment of the radio link L2. Specifically, the link layer 303a causes the battery 320 to supply power to the radio communication unit 303, which has not been supplied with power, and thus activates the radio communication unit 303. The radio communication unit 303 thus activated by the link layer 303a starts connection (PPP connection setup) with the radio communication system 120 via the radio base station 121.

After the radio link L2 is established by the processing performed in Step 230, the radio communication terminal 300 is now connected to both radio communication systems: the radio communication system 110 and the radio communication system 120.

In Step S240, the link layer 303a transmits the fact that the radio link L2 has been established, to the MIH function 311. Specifically, to the MIH function 311, the link layer 303a transmits Link_UP.indication being a LINK event indicating that the radio link has been established.

As FIG. 5 shows, the establishment of the radio link L2 is completed at timing $t_2$, and the radio communication unit 303 receives radio signals from the radio communication system 120 (radio base station 121).

In Step S250, based on the Link_UP.indication received from the link layer 303a, the MIH function 311 notifies the MIH user 313 that the handover preparation is completed. Specifically, to the MIH user 313, the MIH function 311 transmits MIH_Handover_Prepare.confirm being an MIH event indicating completion of handover preparation.

Note that the MIR user 313 having received the MIH_Handover_Prepare.confirm acquires a CoA assigned to the radio communication terminal 300 in a handover target, namely, the radio communication system 120.

In Step S300, as link status acquisition processing, processing similar to that performed in Steps S101 to S113 (part boxed in dotted lines in the drawing) is repeated at every 500 ms. Moreover, in Step S300, the communication quality of the radio link L2 is acquired by processing similar to that performed in Steps S101 to S113. More precisely, upon request from the MIH function 311, the link layer 303a transmits an acquisition request for communication quality, to the radio communication unit 303. Here, assume that RSSI is acquired as the communication quality of the radio link L2.

In Step S310, the MIH user 313 determines that the communication quality of the radio link L1 exceeds the threshold TH2 (handover threshold). Specifically, based on the RSSI included in the MIH_Get_Status.confirm received from the MIH function 311, the MIH user 313 determines that the communication quality of the radio link L1 exceeds the threshold TH2.

In Step S320, the MIH user 313 requests the MIH function 311 to perform a handover from the radio link L1 to the radio link L2. Specifically, to the MIH function 311, the MIH user 313 transmits MIH_Switch being an MIH command requesting a handover.

In Step S330, the MIH function 311 performs a handover from the radio link L1 to the radio link L2. Specifically, the MIH function 311 switches the transmission of the IP packets P (e.g., VoIP packets) via the radio link L1 to the transmission of the IP packets P via the radio link L2.

As FIG. 5 shows, disconnection of the radio link L1 is completed at timing $t_3$, and the radio communication unit 301 stops receiving radio signals transmitted from the radio communication system 110 (radio base station 111).

Note that the MIH function 311 may transmit the same IP packets P via the radio link L1 and the radio link L2 until receiving the IP packets P via the radio link L2.

In Step S340, to the MIH user 313, the MIH function 311 requests the MIH user 313 to commit the handover. Specifically, to the MIH user 313, the MIH function 311 transmits MIH_Commit.request being an MIH event requesting a commit of the handover.

In Step S350, based on receipt of the MIH_Commit.request from the MIH function 311, the MIH user 313 transmits the fact that the handover from the radio link L1 to the radio link L2 has been committed, to the MIH function 311. Specifically, to the MIH function 311, the MIH user 313 transmits IH_HandoverComplete.request being an MIH command signifying that the handover has been committed.

In Step S360, based on receipt of the MIH_HandoverComplete.request from the MIH user 313, the MIH function 311 requests the link layer 301a to disconnect the radio link L1. Specifically, to the link layer 301a, the MIH function 311 transmits Link_Teardown.request being a LINK command requesting radio link disconnection.

In Step S370, based on the Link_Teardown.request received from the MIH function 311, the link layer 301a disconnects the radio link L1. Specifically, the radio communication unit 301 having received an instruction from the link layer 301a to disconnect the radio link disconnects the connection (PPP connection) to the radio connection system 110. In addition, after the connection is disconnected, power supply to the radio communication unit 301 is stopped.

In Step S380, to the MIH function 311, the link layer 301a transmits the fact that the radio link L1 has been disconnected. Specifically, to the MIH function 311, the link layer 301a transmits Link_Teardown.response being a LINK event indicating the radio link disconnection.

In Step S390, based on the Link_Teardown.response received from the link layer 301a, the MIH function 311 notifies the MIH user 313 that the radio link has been disconnected. Specifically, to the MIH user 313, the MIH function 311 transmits MIH_HandoverComplete.response being an MIH event indicating the radio link disconnection.

(4) Functions and Effects

According to the radio communication terminal 300, when the communication quality of the radio link L1 established with the radio communication system 110 exceeds the threshold TH1, the radio communication terminal 300 starts connection with the radio communication system 120, namely, establishment of the radio link L2 to the radio communication system 120. Further, a handover from the radio link L1 to the radio link L2 is performed when the communication quality of the radio link L1 exceeds the threshold TH2 after the establishment of the radio link L2, the threshold TH2 corresponding to communication quality degraded than that indicated by the threshold TH1.

Accordingly, when the radio link L1 offers good communication quality, the radio communication terminal 300 does not connect to the radio communication system 120. More specifically, the radio communication unit 303 is supplied with no power, making it possible to reduce power consumption of the radio communication terminal 300, namely, to extend the duration of the battery 320.

Moreover, the radio link L2 is already established when a handover is performed based on the fact that the communication quality of the radio link L1 exceeds the threshold TH2. Accordingly, drastic communication-quality deterioration, such as packet loss in a handover, can be avoided. Further, since the radio link L2 is already established when a handover is performed, a prompt handover can be accomplished.

In the embodiment, a handover controller 309 is capable of simultaneously transmitting the same packets P from the radio communication unit 301 and the radio communication unit 303 via the radio link L1 and the radio link L2, respectively. In addition, the handover controller 309 can disconnect the radio link L1 when the radio communication unit 303 receives the IP packet P via the radio link L2. For this reason, packet loss in a handover can be avoided even more reliably.

(5) Other Embodiments

As described above, the content of the present invention has been disclosed using the embodiment of the present invention. However, it should be understood that the present invention is not limited by the descriptions and drawings constituting part of the disclosure. In light of the present disclosure, various alternative embodiments will be apparent to those skilled in the art.

For example, what is described in the above-described embodiment is a case of a handover from the radio communication system 110 (radio link L1) to the radio communication system 120 (radio link L2). However, a handover from the radio communication system 120 to the radio communication system 110 may be performed in the same way.

The above-described embodiment employs the radio communication system 110 in conformity with iBurst and the radio communication system 120 in conformity with cdma2000 1x-EVDO. However, the schemes employed by the radio communication system 110 and the radio communication system 120 are not limited to iBurst and cdma2000 1x-EVDO. For example, the radio communication system 110 may be a radio communication system in conformity with mobile WiMAX. Moreover, when Mobile IP is employed, processing of registering an acquired CoA may be performed after the radio link is established in Step S230 described above.

Furthermore, more number of radio communication systems may be included in the communication network 10.

In the above-described embodiment, the radio communication unit being not used is supplied with no power. Alternatively, the radio communication unit may be put in a state supplied with power, specifically, in a sleep state (dormant state).

As described, the present invention naturally includes various embodiments anti the like that are not described herein. Therefore, the technical scope of the present invention should be defined only by matters to define the invention according to the scope of claims reasonably understood from the above description.

Note that the entire content of Japanese Patent Application No. 2007-069564 (filed on Mar. 16, 2007) is incorporated herein by reference.

Industrial Applicability

As described above, with the radio communication device and the radio communication method according to the present invention, a handover can be performed with reduced power consumption and with less chance of packet loss, when multiple radio communication systems employing different physical-layer schemes are used. Accordingly, the radio communication device and the radio communication method according to the present invention are useful in radio communications such as mobile communications.

The invention claimed is:

1. A radio communication device including:
a radio communication unit configured to perform radio communication by connecting to a first radio communication system and to a second radio communication system different from the first radio communication system; and
a mobility manager configured to manage mobility from the first radio communication system to the second radio communication system,
the radio communication device comprising:
a communication quality acquirer configured to acquire communication quality of a first radio link established with the first radio communication system;
a communication quality determination unit configured to determine whether or not the communication quality acquired by the communication quality acquirer exceeds a first threshold or a second threshold corresponding to the communication quality degraded than that indicated by the first threshold; and
a handover controller configured to control a handover from the first radio communication system to the second radio communication system, wherein
when the communication quality determination unit determines that the communication quality exceeds the first threshold, the handover controller starts connection with the second radio communication system and establishes a second radio link with the second radio communication system,
when the communication quality determination unit determines that the communication quality exceeds the second threshold after the second radio link has been established, the handover controller performs a handover from the first radio link to the second radio link,
the handover controller causes the radio communication unit to transmit the same packets simultaneously via the first radio link and the second radio link,
when the radio communication unit has received a packet via the second radio link, the handover controller disconnects the first radio link,
the handover controller includes a media independent handover function not depending on a configuration of a physical layer of each of the first radio communication system and the second radio communication system, and
the media independent handover function performs the handover based on an instruction from a protocol positioned in a layer higher than the media independent handover function.

* * * * *